US006665543B1

United States Patent
McCleary et al.

(10) Patent No.: US 6,665,543 B1
(45) Date of Patent: Dec. 16, 2003

(54) ANTENNA EXTRACTION ON REMOVAL OF STYLUS FOR HANDHELD DEVICE

(75) Inventors: Jay B. McCleary, West Valley, UT (US); Kenneth A. Croft, Salt Lake City, UT (US); Curtis D. Thompson, Taylorsville, UT (US)

(73) Assignee: 3Com Corporation, Santa Clara, CA (US)

(*) Notice: Subject to any disclaimer, the term of this patent is extended or adjusted under 35 U.S.C. 154(b) by 583 days.

(21) Appl. No.: 09/684,746

(22) Filed: Oct. 4, 2000

(51) Int. Cl.[7] ................................................. H04Q 1/24
(52) U.S. Cl. ........................ 455/550; 455/90; 455/575; 343/702
(58) Field of Search ......................... 455/550, 90, 575, 455/556, 347, 128, 129, 73, 403, 95; 343/702, 872, 900, 906

(56) References Cited

U.S. PATENT DOCUMENTS 5,739,793 A * 4/1998 Adachi ....................... 343/702
6,191,743 B1 * 2/2001 Jones et al. ................. 343/702
6,262,684 B1 * 7/2001 Stewart et al. .............. 343/702
6,275,193 B1 * 8/2001 Nilsen et al. ................ 343/702
6,353,414 B1 * 3/2002 Jones et al. ................. 343/702
2003/0069039 A1 * 4/2003 Lin et al. ..................... 455/556
2003/0092468 A1 * 5/2003 North .......................... 455/556

* cited by examiner

*Primary Examiner*—P Tran
(74) *Attorney, Agent, or Firm*—Wagner, Murabito & Hao LLP (57) ABSTRACT

An antenna configuration for storing and deploying an antenna used with a hand-held wireless device, and method thereof. The device housing has a molded opening for holding a stylus element used with the device. The antenna is also stored in the housing within the molded opening. When the stylus is removed from the molded opening, the antenna can slide within the opening to a position in which it protrudes at one end from the housing. Thus, the antenna can be stored where it is protected and out of the way. In addition, the current form factor (size, shape and appearance) of the hand-held device can be retained.

20 Claims, 12 Drawing Sheets

ANTENNA EXTRACTION ON REMOVAL OF STYLUS FOR HANDHELD DEVICE

BACKGROUND OF THE INVENTION

1. Field of the Invention

The present invention relates to the field of wireless transceiver devices. Specifically, the present invention relates to an antenna configuration for a portable wireless transceiver device.

2. Related Art

Wireless technologies are widely used for communication in modern society. In addition to personal cordless telephones (e.g., cell phones) and pagers, computer systems (in particular, handheld or portable computer systems including personal digital assistants) are more commonly being equipped with transceivers capable of broadcasting wireless signals (e.g., radio signals) over relatively long distances.

In addition, efforts are underway to develop technologies allowing hardware connections (e.g., cable connections) between devices to be replaced with wireless ones. For example, the Bluetooth technology provides a technology specification for small form factor, low-cost, short-range radio links between personal computers, mobile phones and other devices. Bluetooth is targeted at users who wish to establish a link, or small network, between their computer, cellular phone and other peripherals.

Wireless communication technologies provide users with greater mobility and convenience. Mobility and convenience are enhanced as devices such as cell phones and personal digital assistants (PDAs) are reduced in size. However, even as wireless communication devices are being made smaller and lighter, consumer preferences are driving manufacturers to further reduce the size and weight of such devices relative to the competition.

Manufacturers are also being driven by consumer preferences to provide wireless communication devices with additional functionality and features, in order to enhance user convenience as well as to distinguish their devices from competing devices. Accordingly, manufacturers must turn to creative and innovative approaches to provide added functionality and features without increasing the size and weight of the device, and without eliminating existing features.

Antennas used by wireless devices take many different forms in the prior art. One problem with prior art antenna designs is that they are in a fixed position extending from the device, even when not in use, and thus may be prone to breakage. Another problem is that such antennas, because they extend from the device, can get in the way or can otherwise inconvenience a user. As described above, it is desirable for the wireless devices to be as small as possible. However, an antenna protruding from the device in effect increases the size of the device, perhaps preventing the user from storing the device in a desired location (e.g., within his or her pocket). In addition, even if the wireless device can be placed in a pocket, for example, the protruding antenna may still cause the user some degree of discomfort or inconvenience.

Thus, it is desirable to have an antenna design located on a wireless device such that the antenna is both unobtrusive to a user and protected. Furthermore, it is desirable to have an antenna design that satisfies the above need and that can be conveniently implemented by the user. In addition, it is desirable to have an antenna design that satisfies the above needs and that will not increase the size or shape of the wireless device. The present invention provides these advantages and others not specifically mentioned above but described in the sections to follow.

SUMMARY OF THE INVENTION

The present invention provides an antenna design and method thereof that locates an antenna in an unobtrusive and protected location on a wireless device. Furthermore, the present invention provides an antenna design and method thereof that allow the antenna to be conveniently implemented by the user. In addition, the present invention provides an antenna design and method thereof that will not increase the size or shape of the wireless device.

The present invention pertains to an antenna configuration for storing and deploying an antenna used with a hand-held wireless device, and a method thereof. The device housing has a molded opening for holding a stylus element used with the device. The antenna is also stored in the housing within the molded opening. When the stylus is removed from the molded opening, the antenna can slide within the opening to a position in which it protrudes at one end from the housing.

In one embodiment, the extractable antenna is held in place within the molded opening by the stylus element. When the stylus element is removed, the antenna automatically moves to the position in which it protrudes from the device housing.

In another embodiment, the extractable antenna is held in place within the molded opening by engaging the antenna with some aspect of the molded opening (e.g., a notch). When the stylus element is to be removed, it is momentarily pressed deeper into the opening. This action disengages the antenna from the notch, and when the stylus is removed, the antenna moves to its protruding position.

The antenna can be coupled to the transceiver by suitable means. In one embodiment, the antenna is coupled to the transceiver using a flexible connector that allows the antenna to move. In another embodiment, a conducting element coupled to the transceiver is situated in the molded opening at a location that allows the conducting element to be in contact with the antenna when the antenna is moved to its protruding position.

Therefore, in accordance with the present invention, the antenna can be stored in a position in which it is protected and out of the way. In addition, by using the molded opening to store and deploy the antenna, the form factor (size, shape and appearance) of existing hand-held devices can be retained. Furthermore, the antenna can be readily stored and deployed by a user. These and other objects and advantages of the present invention will become obvious to those of ordinary skill in the art after having read the following detailed description of the preferred embodiments which are illustrated in the various drawing figures.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Exemplary Portable Computer System Network Environment

Figure 1A:
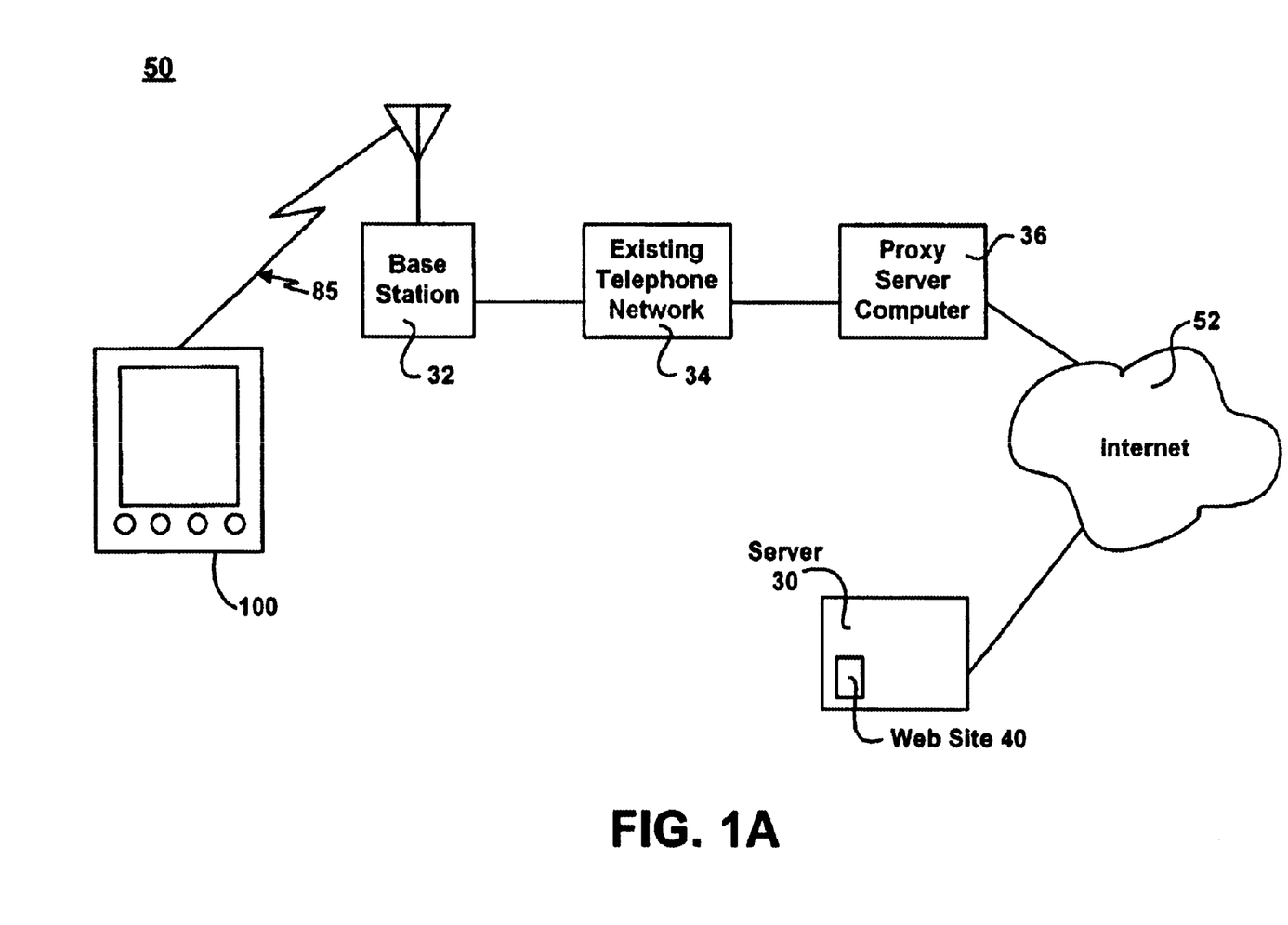
FIG. 1A is a block diagram of an exemplary network environment including a portable computer system in accordance with one embodiment of the present invention.

FIG. 1A is a block diagram of an exemplary network environment 50 including a portable computer system 100 in accordance with one embodiment of the present invention. Portable computer system 100 is also known as a palmtop or palm-sized computer system or as a personal digital assistant (PDA).

In the present embodiment, portable computer system 100 has the ability to transmit and receive data and information over a wireless communication interface (e.g., a radio interface). In one embodiment, the wireless communication interface is integrated into portable computer system 100; in another embodiment, the wireless communication interface is accomplished with a wireless modem attachment (not shown). Wireless signals are transmitted and received by portable computer system 100 using antenna 85.

In accordance with the present invention, antenna 85 is an extractable antenna. Additional information is provided in conjunction with FIGS. 8A, 8B, 9 and 10.

In the present embodiment, base station 32 is both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34. Furthermore, proxy server computer system 36 is coupled to the Internet 52, thereby enabling portable computer system 100 to communicate with the Internet 52.

Coupled with Internet 52 are multiple servers exemplified by server 30. Residing on server 30 is a Web site 40. When communicating with a Web site over Internet 52, protocols such as CTP (Compact Transport Protocol) and CML (Compact Markup Language) can be used by portable computer system 100 in the present embodiment.

It should be further appreciated that other embodiments of a communications network, planned or envisioned, may be utilized in accordance with the present invention. For example, a wireless connection may be made from portable computer system 100 via antenna 85 directly to the Internet 52.

The data and information which are communicated between base station 32 and portable computer system 100 via antenna 85 are the same type of information and data that can conventionally be transferred and received over a public telephone wire network system. However, a wireless communication interface is utilized to communicate data and information between portable computer system 100 and base station 32. It should be appreciated that one embodiment of a wireless communication system in accordance with the present invention is the Mobitex wireless communication system.

Figure 1B:
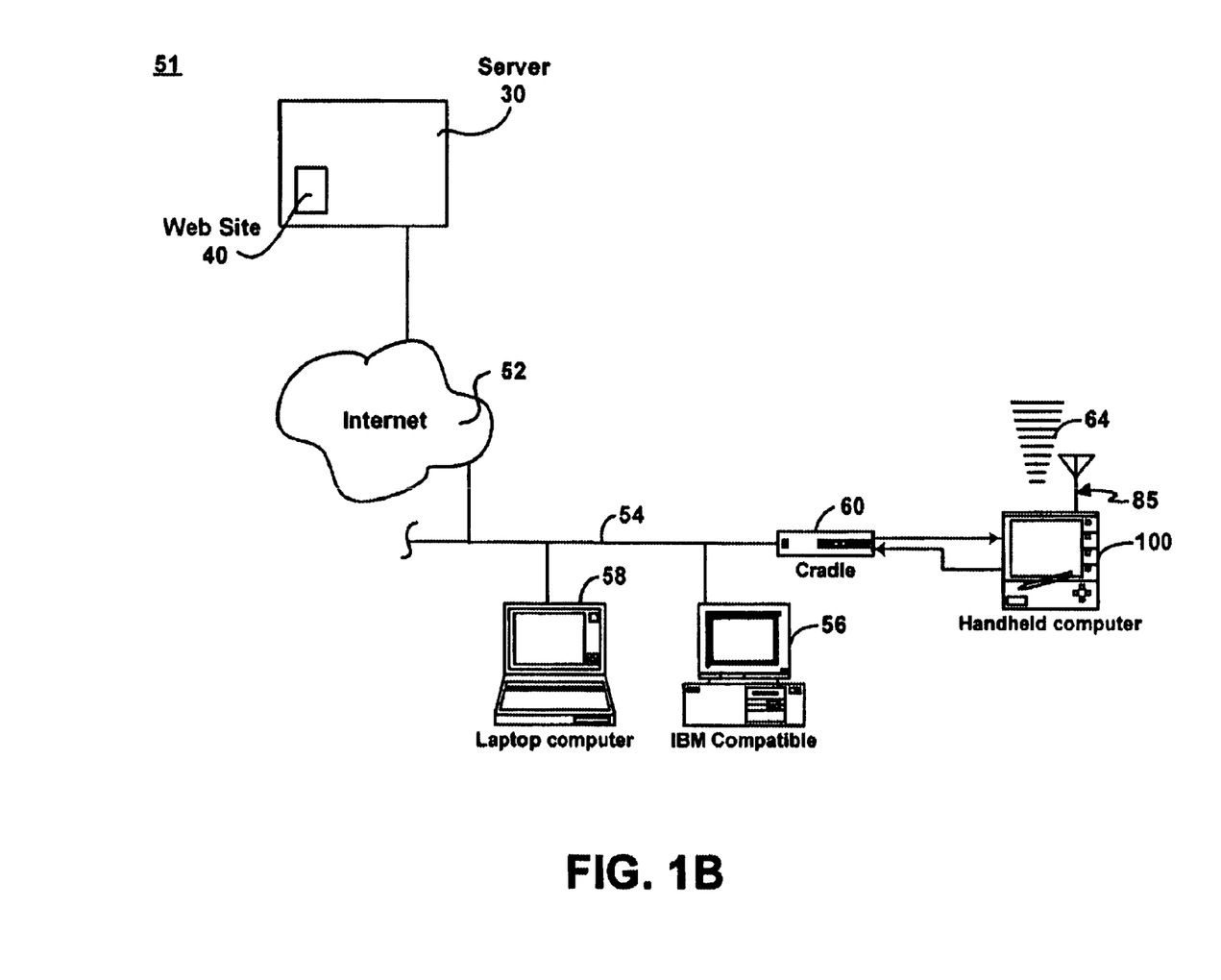
FIG. 1B is a block diagram of a portable computer system connected to other computer systems and the Internet via a cradle device in accordance with one embodiment of the present invention.

FIG. 1B illustrates another embodiment of a system 51 that can be used in conjunction with various embodiments of the present invention. System 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Bus 54 can provide communication with the Internet 52 using a number of well-known protocols. Coupled with Internet 52 are multiple servers exemplified by server 30. Residing on server 30 is a Web site 40.

In one embodiment, bus 54 is coupled to a cradle 60 for receiving and initiating communication with portable computer system 100 of the present invention. Cradle 60 provides an electrical and mechanical communication interface between bus 54 (and anything coupled to bus 54) and the computer system 100 for two-way communications. Computer system 100 also contains a wireless infrared communication mechanism 64 for sending and receiving information from other devices (e.g., "beaming").

In accordance with the present invention, portable computer system 100 may instead be coupled to host computer systems 56 and 58 via a wireless (radio) connection using antenna 85. In this embodiment, antenna 85 is an extractable antenna. Additional information is provided in conjunction with FIGS. 8A, 8B, 9 and 10.

Figure 2:
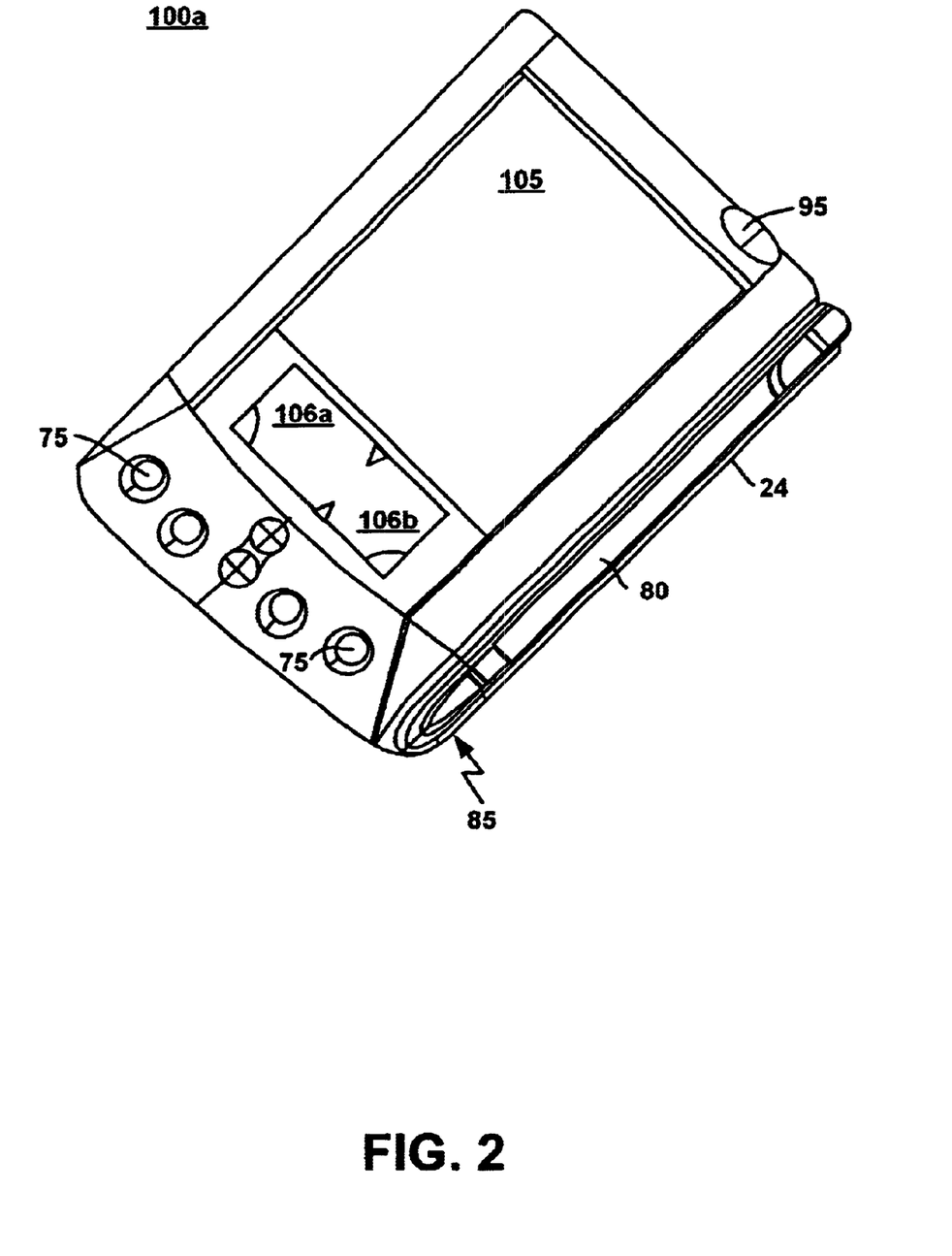
FIG. 2 is a top side perspective view of a portable computer system in accordance with one embodiment of the present invention.

Exemplary Portable Computer System With Wireless Transceiver and Extractable Antenna FIG. 2 is a perspective illustration of the top face 100a of one embodiment of the palmtop computer system 100 of the present invention. The top face 100a contains a display screen 105 surrounded by a bezel or cover. A removable stylus 80 is also shown. In this embodiment, top face 100a is formed with a recess 24 for holding stylus 80.

The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

In accordance with the present invention, an extractable antenna 85 is also situated within recess 24, in proximity to stylus 80. Additional information with regard to the extractable antenna 85 is provided in conjunction with FIGS. 8A, 8B, 9 and 10.

FIG. 2 also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 3:
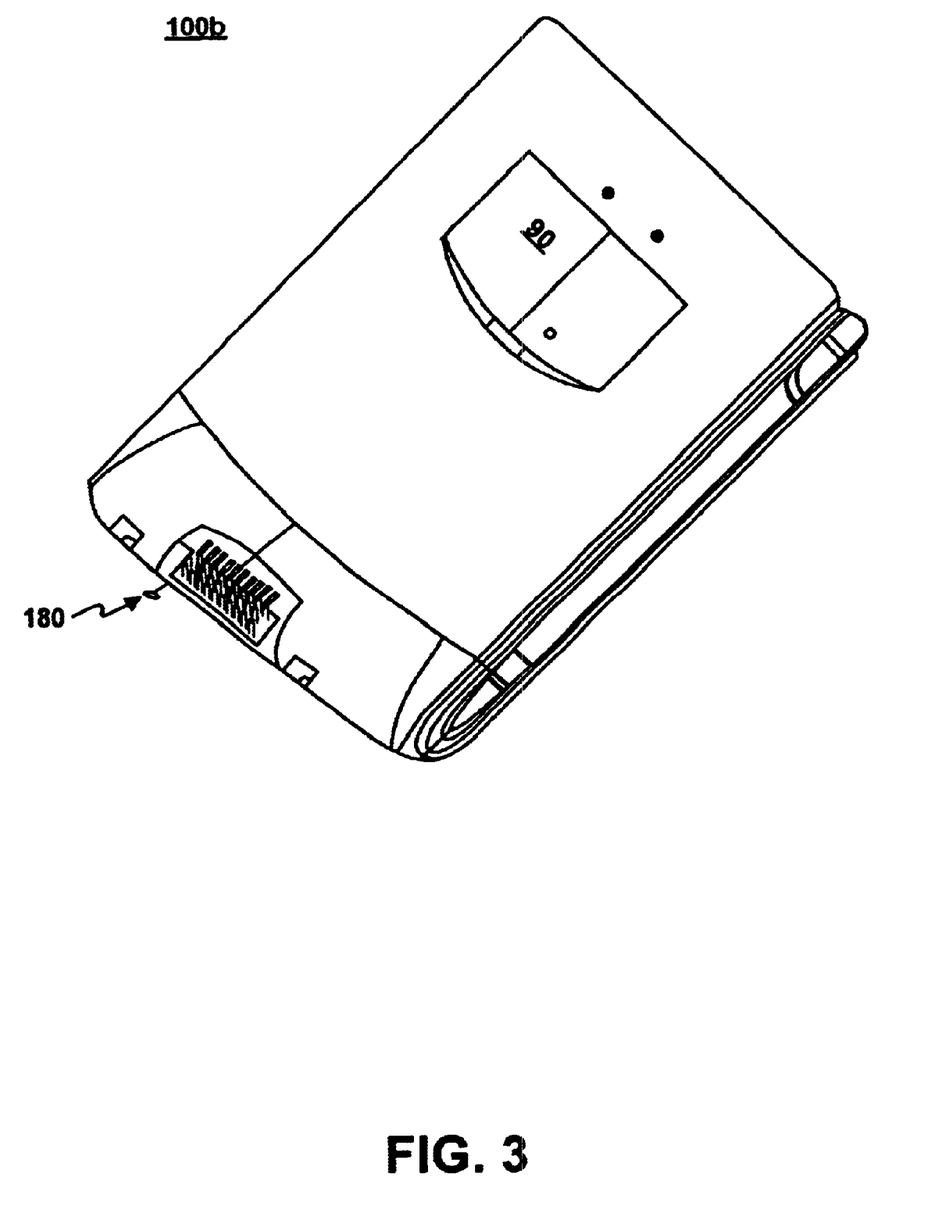
FIG. 3 is a bottom side perspective view of the portable computer system of FIG. 2.

FIG. 3 illustrates the bottom side 100b of one embodiment of the palmtop computer system that can be used in accordance with various embodiments of the present invention. A communication interface 180 is also shown. In one embodiment of the present invention, the communication interface 180 is a serial communication port, but could also alternatively be of any of a number of well-known communication standards and protocols, e.g., parallel, SCSI (small computer system interface), Firewire (IEEE 1394), Ethernet, etc. Also shown is a battery storage compartment door 90.

Figure 4:
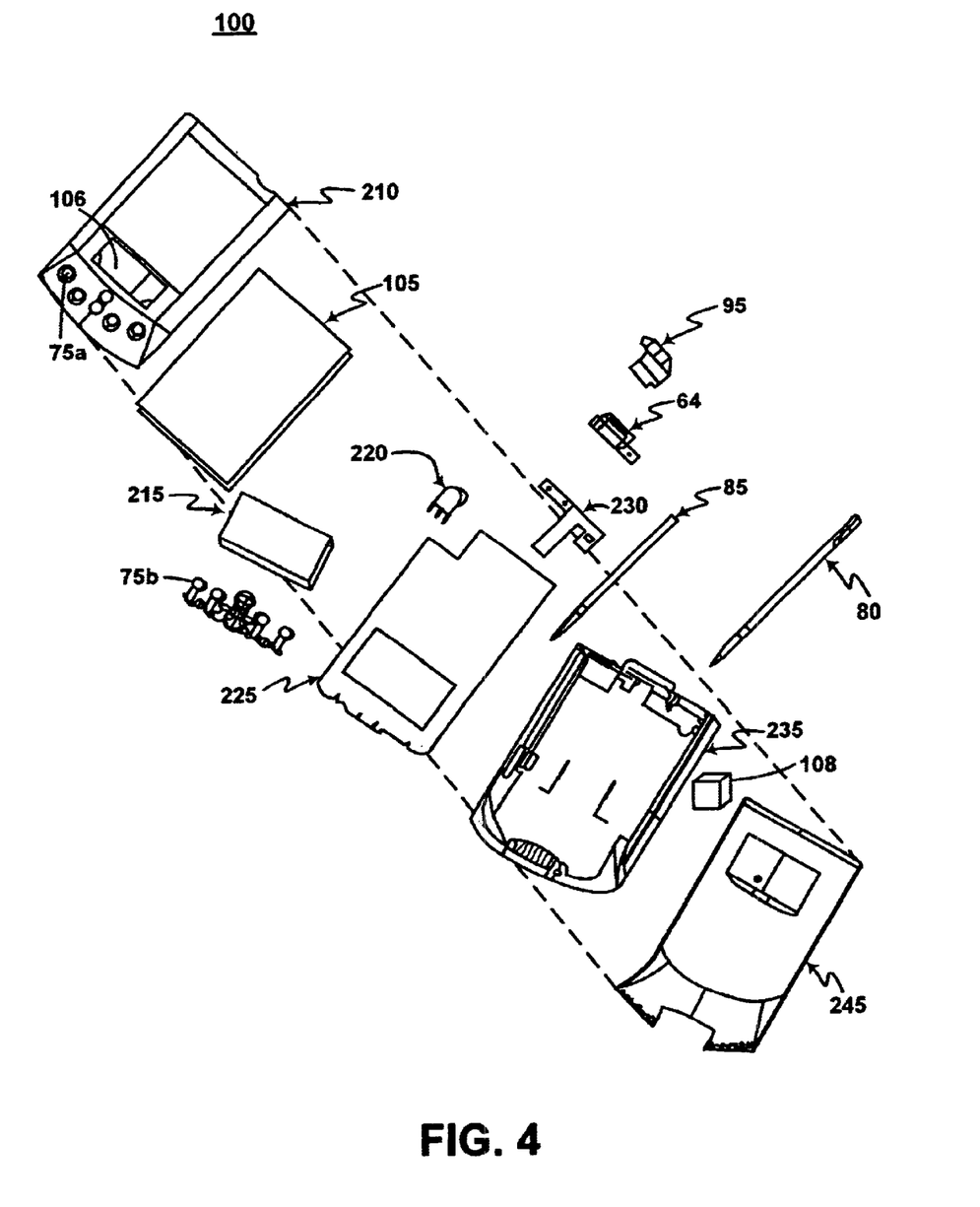
FIG. 4 is an exploded view of the components of the portable computer system of FIG. 2.

FIG. 4 is an exploded view of the palmtop computer system 100 in accordance with one implementation. Computer system 100 contains a back cover 245, and a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission display (FED), plasma, etc., for the flat panel display 105. A battery 215 provides electrical power. A contrast adjustment (potentiometer) 220 is also shown, as well as an on/off button 95. A flex circuit 230 is shown along with a printed circuit (PC) board 225 containing electronics and logic (e.g., memory, communication bus, processor, etc.) for implementing computer system functionality. The digitizer pad is also included in PC board 225. A midframe 235 is shown along with stylus 80.

In accordance with the present invention, antenna 85 is an extractable antenna. Additional information is provided in conjunction with FIGS. 8A, 8B, 9 and 10.

Infrared communication mechanism 64 (e.g., an infrared emitter and detector device) is for sending and receiving information from other similarly equipped devices (see FIG. 1B). A signal (e.g., radio) receiver/transmitter device 108 is also shown. The receiver/transmitter device 108 is coupled to the antenna 85 and also coupled to communicate with the PC board 225. In one implementation the Mobitex wireless communication system is used to provide two-way communication between computer system 100 and other networked computers and/or the Internet via a proxy server (see FIG. 1A).

Figure 5:
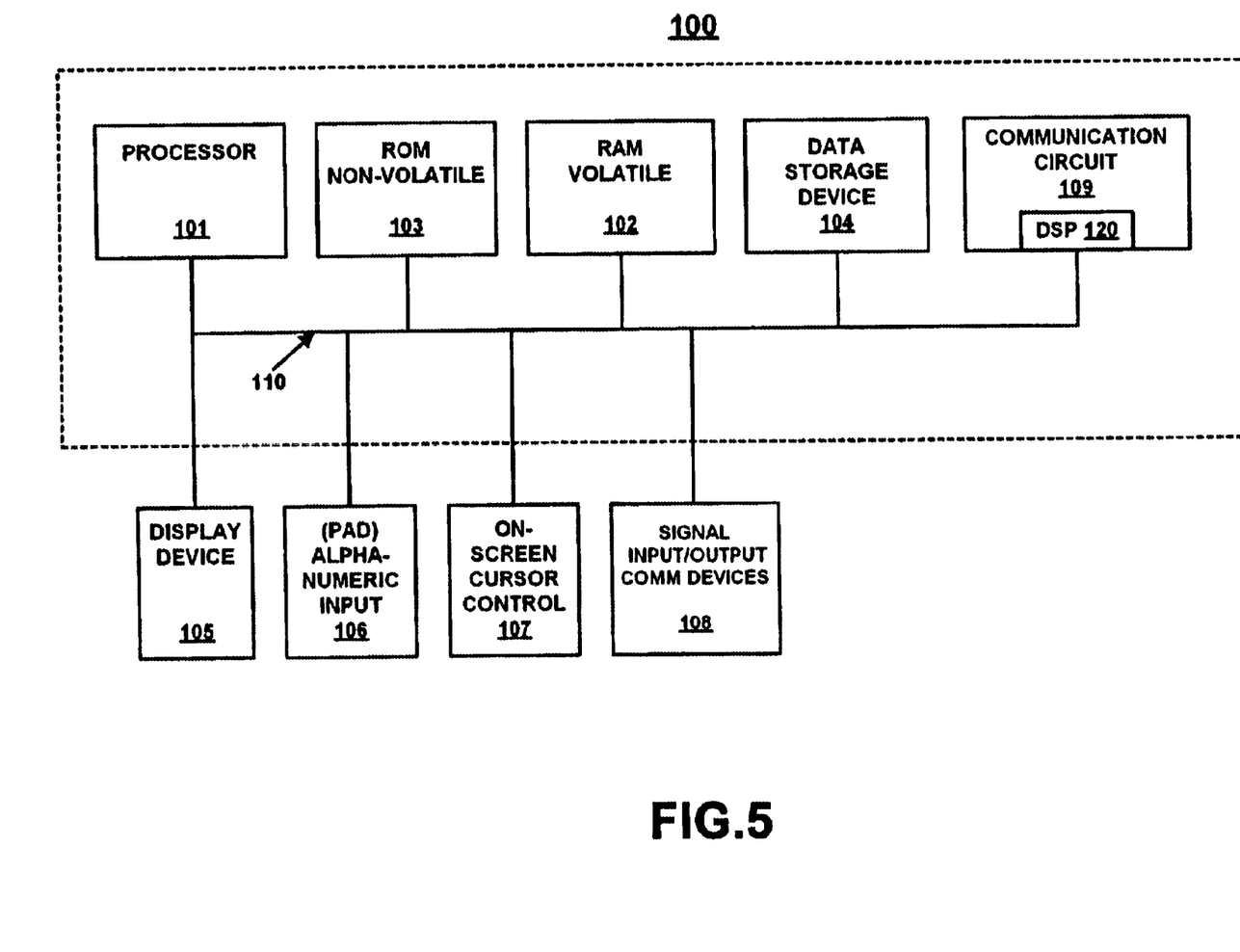
FIG. 5 is a block diagram of one embodiment of a portable computer system in accordance with the present invention.

FIG. 5 illustrates circuitry of computer system 100, some of which can be implemented on PC board 225 (FIG. 4). Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Computer system 100 also includes an optional data storage device 104 (e.g., memory stick) coupled with the bus 110 for storing information and instructions. Device 104 can be removable. As described above, computer system 100 also contains a display device 1 05 coupled to the bus 110 for displaying information to the computer user. PC board 225 can contain the processor 101, the bus 110, the ROM 103 and the RAM 102.

With reference still to FIG. 5, computer system 100 also includes a signal transmitter/receiver device 108, which is coupled to bus 110 for providing a physical communication link between computer system 100, and a network environment (e.g., network environments 50 and 51 of FIGS. 1A and 1B). As such, signal transmitter/receiver device 108 enables central processor unit 101 to communicate wirelessly with other electronic systems coupled to the network.

It should be appreciated that within the present embodiment, signal transmitter/receiver device 108 is coupled to antenna 85 (FIG. 4) and provides the functionality to transmit and receive information over a wireless communication interface. It should be further appreciated that the present embodiment of signal transmitter/receiver device 108 is well suited to be implemented in a wide variety of ways. For example, signal transmitter/receiver device 108 could be implemented as a modem.

In one embodiment, computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in computer system 100 of FIG. 5 is an optional alphanumeric input device 106 that in one implementation is a handwriting recognition pad ("digitizer") having regions 106a and 106b (FIG. 2), for instance. Alphanumeric input device 106 can communicate information and command selections to processor 101. Computer system 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. Onscreen cursor control device 107 is capable of registering a position on display device 105 where the stylus makes contact. The display device 105 utilized with computer system 100 may be a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flat panel display.

Figure 6:
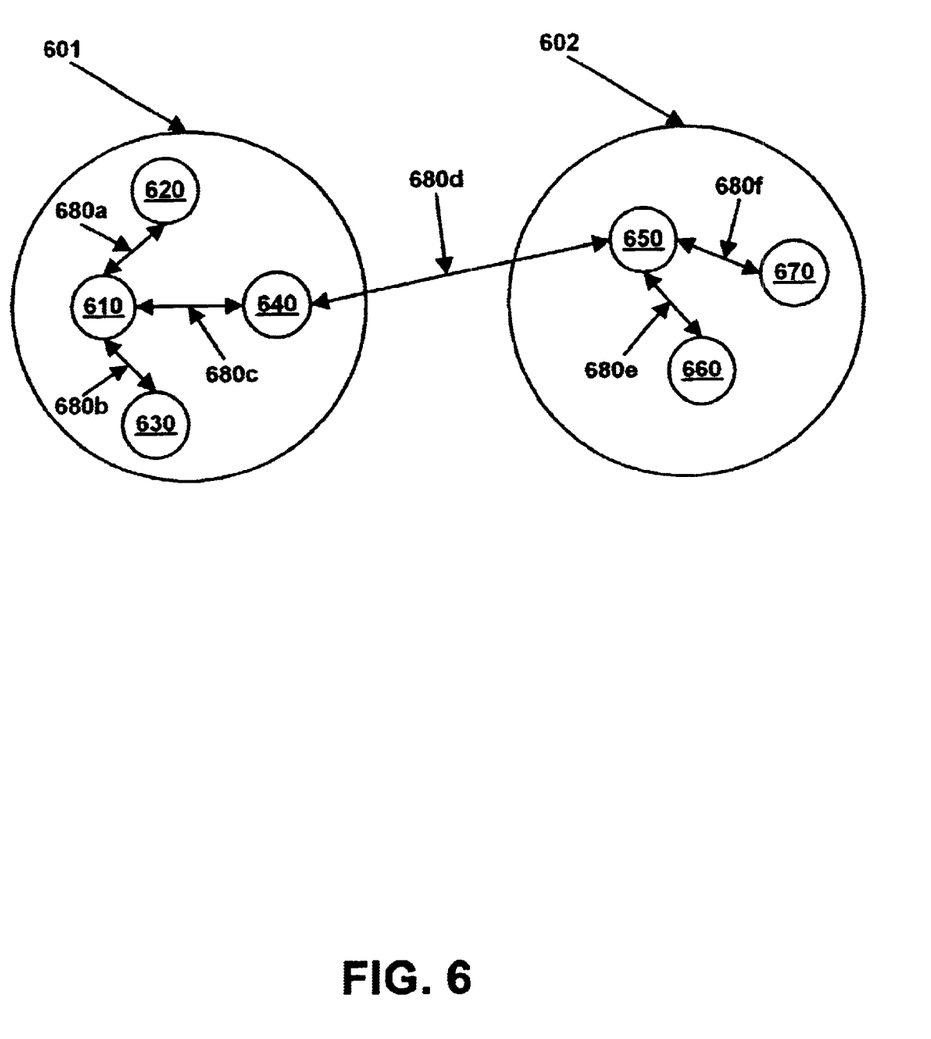
FIG. 6 illustrates one embodiment of a network of devices coupled using wireless connections in accordance with the present invention.

Exemplary Bluetooth System and Wireless Communication Device With Extractable Antenna FIG. 6 illustrates the topology of a network of devices wirelessly connected in a Bluetooth system in accordance with one embodiment of the present invention. Bluetooth is the code name for a technology specification for small form factor, low-cost, short-range radio links between personal computers, mobile phones and other devices. In the parlance of Bluetooth, a collection of devices connected in a Bluetooth system is referred to as a "piconet" or a "subnet." A piconet starts with two connected devices, such as a computer system and a cellular phone, and may grow to eight connected devices. All Bluetooth devices are peer units; however, when establishing a piconet, one unit will act as a master and the other(s) as slave(s) for the duration of the piconet connection.

A Bluetooth system supports both point-to-point and point-to-multi-point connections. Several piconets can be established and linked together in a "scatternet," where each piconet is identified by a different frequency hopping sequence. All devices participating on the same piconet are synchronized to their respective hopping sequence.

Accordingly, devices 610, 620, 630 and 640 are coupled in piconet 601 using wireless connections 680a–c. Similarly, devices 650, 660 and 670 are coupled in piconet 602 using wireless connections 680e–f. Piconet 601 and piconet 602 are coupled using wireless connection 680d. Devices 610–670 can be printers, personal digital assistants (PDAs), desktop computer systems, laptop computer systems, cell phones, fax machines, keyboards, joysticks and virtually any other digital device. In the present embodiment, devices 610–670 are Bluetooth devices; that is, they are equipped with a Bluetooth radio transceiver, or they are adapted to communicate with Bluetooth devices ("Bluetooth-enabled"). That is, the Bluetooth radio transceiver may be integrated into a device, or it may be coupled to a device.

Figure 7:
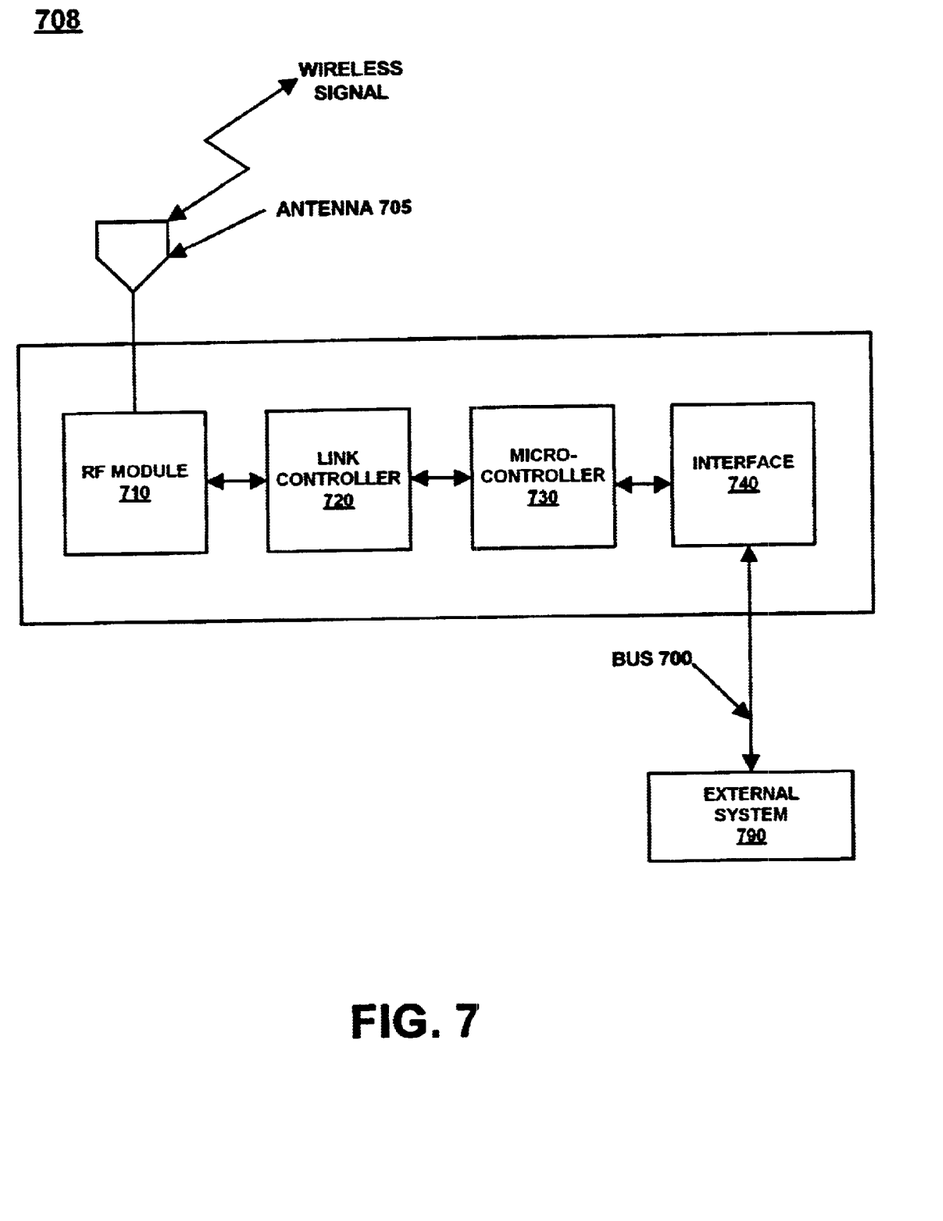
FIG. 7 is a block diagram showing one embodiment of a wireless transceiver in accordance with the present invention.

FIG. 7 is a block diagram of one embodiment of a transceiver 708 in accordance with the present invention. In this embodiment (the "Bluetooth embodiment"), transceiver 708 is a Bluetooth device comprising a digital component (e.g., a Bluetooth controller) and an analog component (e.g., a Bluetooth radio).

In the present embodiment, transceiver 708 comprises an antenna 705 for receiving or transmitting radio signals, a radio frequency (RF) module 710, a link controller 720, a microcontroller (or central processing unit) 730, and an external interface 740. In the present embodiment, transceiver 708 is coupled by a system bus 700 to an external device 790 (e.g., a host device such as a computer system or similar intelligent electronic device, a PDA, a printer, a fax machine, etc.). However, it is appreciated that in another embodiment, transceiver 708 may be integrated into external device 790.

In accordance with the present invention, antenna 705 is an extractable antenna. Additional information is provided in conjunction with FIGS. 8A, 8B, 9 and 10.

In the Bluetooth embodiment, RF module 710 is a Bluetooth radio. In this embodiment, link controller 720 is a hardware digital signal processor for performing baseband processing as well as other functions such as Quality-of-Service, asynchronous transfers, synchronous transfers, audio coding, and encryption.

In one embodiment, microcontroller 730 is an application specific integrated circuit (ASIC). In the Bluetooth embodiment, microcontroller 730 is a separate central processing unit (CPU) core for managing transceiver 708 and for handling some inquiries and requests without having to involve the host device. In the Bluetooth embodiment, microcontroller 730 runs software that discovers and communicates with other Bluetooth devices.

In the present embodiment, before any connections between Bluetooth devices are created, all devices are in a standby mode. In this mode, an unconnected unit "listens" for messages at a regular rate on a set of hop frequencies defined for that unit. In a sniff mode, a Bluetooth device listens to the piconet at a reduced rate (relative to the regular rate). In a park mode, a Bluetooth device is still synchronized to the piconet but does not participate in the traffic.

With reference still to FIG. 7, in the present embodiment, interface 740 is for coupling transceiver 708 to external device 790 in a suitable format, such as but not limited to Universal Serial Bus (USB), Personal Computer Memory Card International Association (PCMCIA), Peripheral Component Interconnect (PCI), CardBus, or Personal Computer (PC) Card. In the present embodiment, interface 740 runs software that allows transceiver 708 to interface with the operating system of external device 790.

Extractable Antenna for a Wireless Transceiver Device

Figure 8A:
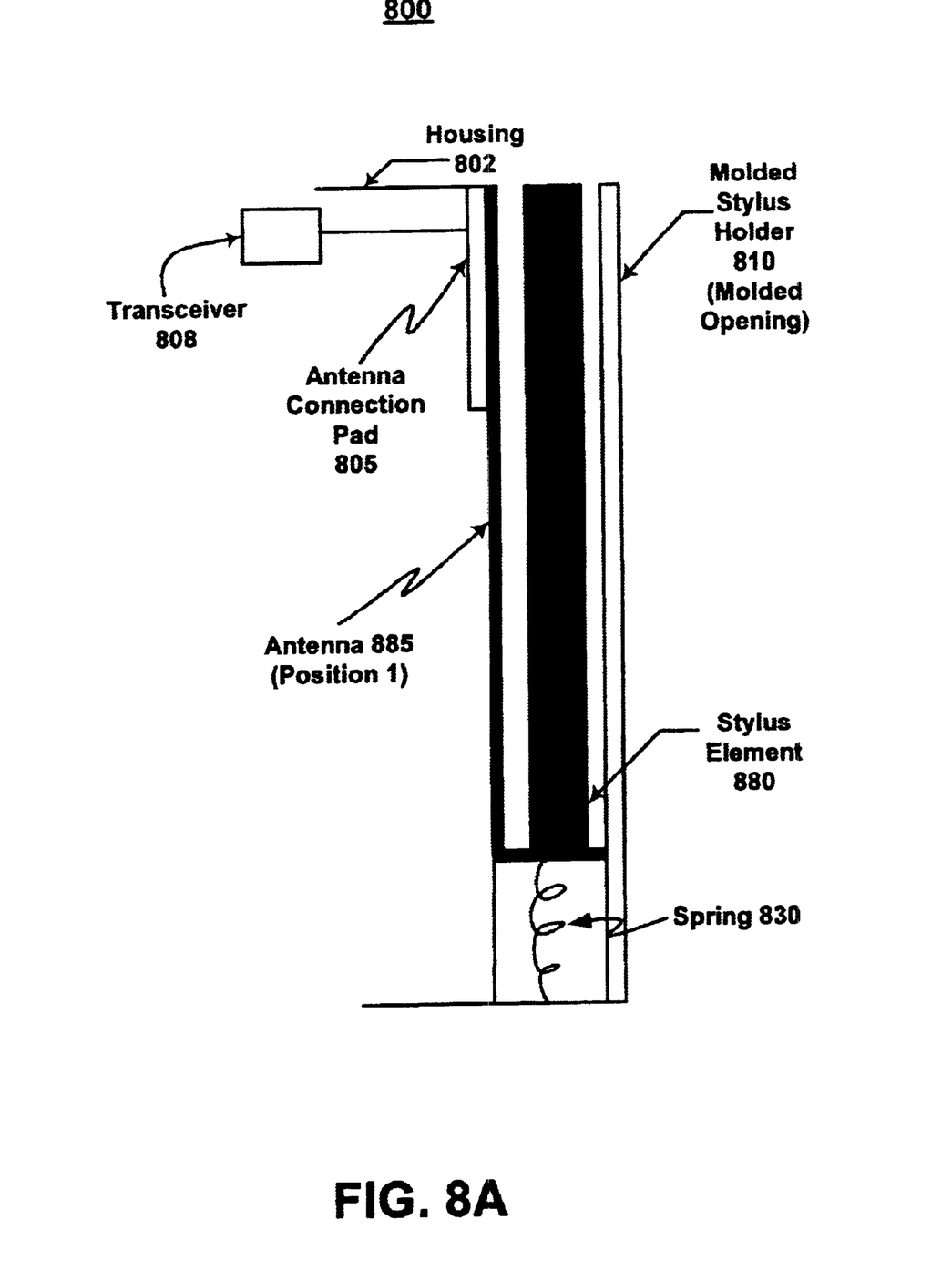
FIG. 8A is a cross-sectional view of a wireless device showing an antenna in a stored position in accordance with one embodiment of the present invention.

FIG. 8A is a cross-sectional view of a wireless communication device 800 showing an extractable antenna 885 in a stored position in accordance with one embodiment of the present invention. Wireless communication device 800 may be, for example, a PDA such as portable computer system 100 of FIGS. 1A through FIG. 5, or a Bluetooth device such as transceiver 708 of FIG. 7. It is appreciated that pivotable antenna 885 can be used with othertypes of devices that have a stylus element 880.

With reference to FIG. 8A, in the present embodiment, wireless communication device 800 is typically contained within a housing 802 that has a molded opening 810 for holding, for example, a stylus element 880. It is appreciated that the molded opening 810 need not be for a stylus, but can be for holding a similar type of element.

In the present embodiment, molded opening 810 is completely enclosed within housing 802; however, in other embodiments, molded opening 810 may be only partially enclosed by housing 802. That is, molded opening 810 may be recessed into housing 802, like recess 24 of FIG. 2.

With reference to FIG. 8A, antenna 885 is in a stored or retracted position (position 1) within molded opening 810. In one embodiment, antenna 885 is held in position 1 by stylus element 880. In this embodiment, removal of stylus element 880 causes antenna 885 to slide in molded opening 810 in response to a force applied by spring 830. Spring 830 is coupled at one end to antenna 885 and at its other end to housing 802 (or to some other feature of wireless communication device 800), and thus spring 830 also limits the extent of travel of antenna 885.

In another embodiment, antenna 885 is engaged with molded opening 810; for example, antenna 885 may be shaped so that it can engage with a notch (not shown) that is formed in molded opening 810. In this embodiment, antenna 885 is released from the retracted position by momentarily pressing stylus element 880 deeper into molded opening 810, and then releasing stylus element 880 so that it and antenna 885 can freely slide within molded opening 810 by force of spring 830.

In the present embodiment, antenna connection pad 805 is coupled to transceiver 808. Antenna connection pad 805 is a conducting element for coupling antenna 885 to transceiver 808 when antenna 885 is deployed, as shown by FIG. 8B.

Figure 8B:
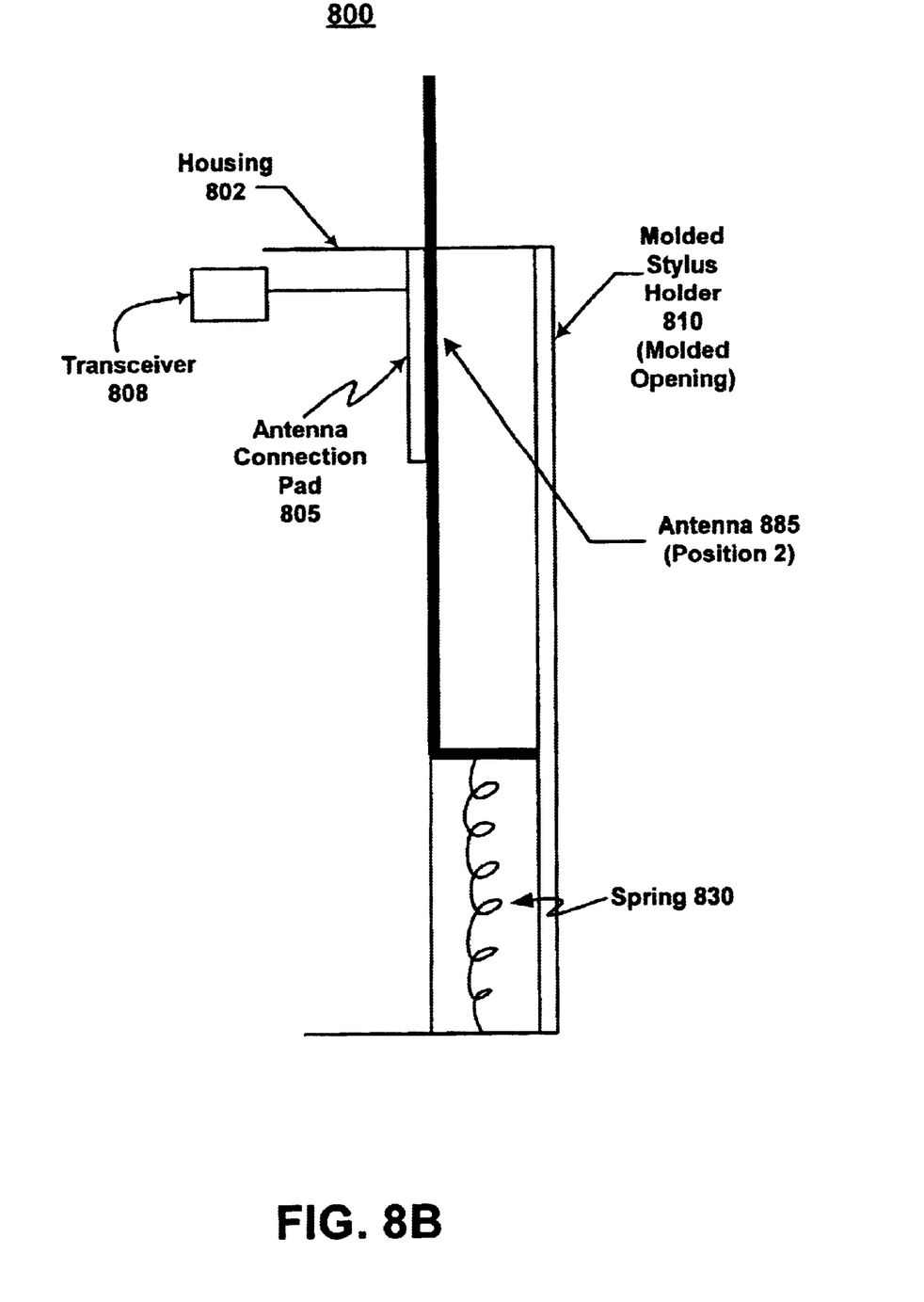
FIG. 8B is a cross-sectional view of a wireless device showing an antenna in a deployed position in accordance with one embodiment of the present invention.

FIG. 8B is a cross-sectional view of the wireless communication device 800 of FIG. 8A showing the antenna 885 in a deployed (protruding) position (position 2) in accordance with one embodiment of the present invention. In this embodiment, stylus element 880 (FIG. 8A) has been removed, allowing antenna 885 to slide along molded opening 810 to a position in which the end of antenna 885 extends outside of housing 802.

Continuing with reference to FIG. 8B, antenna 885 is in contact with antenna connection pad 805 and thus is coupled to transceiver 808. It is appreciated that other means may be used to couple antenna 885 and transceiver 808. For example, antenna 885 can be coupled to transceiver 808 using a flexible connector (e.g., a wire or lead) that is of sufficient length to maintain the connection while allowing antenna 885 to move between position 1 (FIG. 8A) and position 2.

Figure 9:
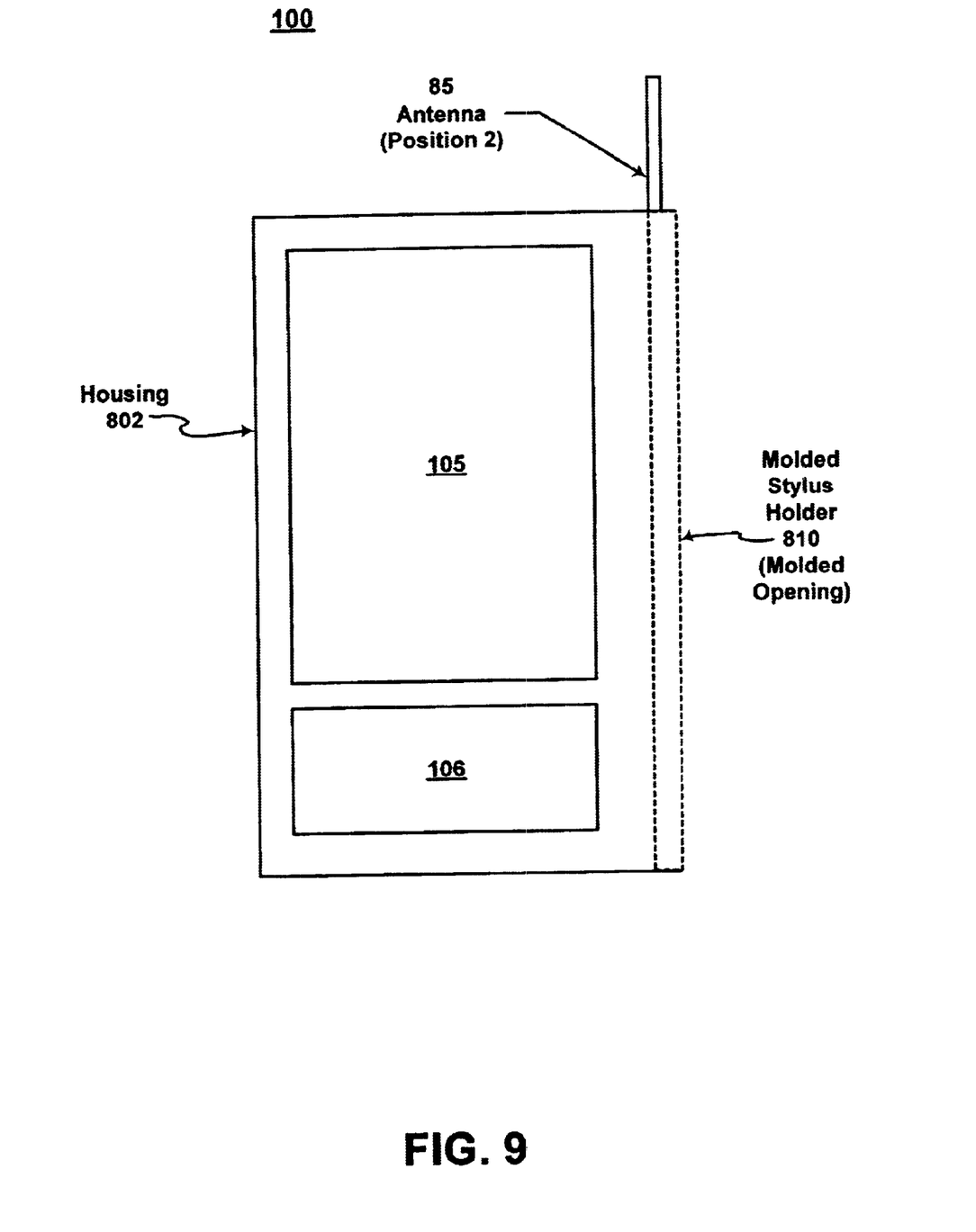
FIG. 9 is an illustration of a portable computer system showing an antenna deployed in accordance with one embodiment of the present invention.

FIG. 9 is an illustration of a portable computer system 100 (FIG. 1A through FIG. 5) showing an antenna 85 deployed (e.g., in position 2) in accordance with one embodiment of the present invention. It is appreciated that pivotable antenna 85 can be used with other types of devices that have a stylus element (not shown). As described in conjunction with FIGS. 8A and 8B, antenna 85 can slide within molded stylus holder 810. As shown, molded stylus holder 810 is enclosed within housing 802; however, molded stylus holder 810 can instead be recessed into housing 802 (like recess 24 of FIG. 2). In the present embodiment, when stored (position 1), antenna 85 would not extend beyond housing 802.

Thus, in accordance with the present invention, the antenna is stored on a wireless device (e.g., a portable computer system 100 or a Bluetooth device such as transceiver 708) so that the antenna is both unobtrusive to a user and protected. Furthermore, the antenna design of the present invention is conveniently implemented by the user. In addition, the antenna design of the present invention maintains existing form factors, and therefore will not increase the size or shape of the wireless communication device.

Figure 10:
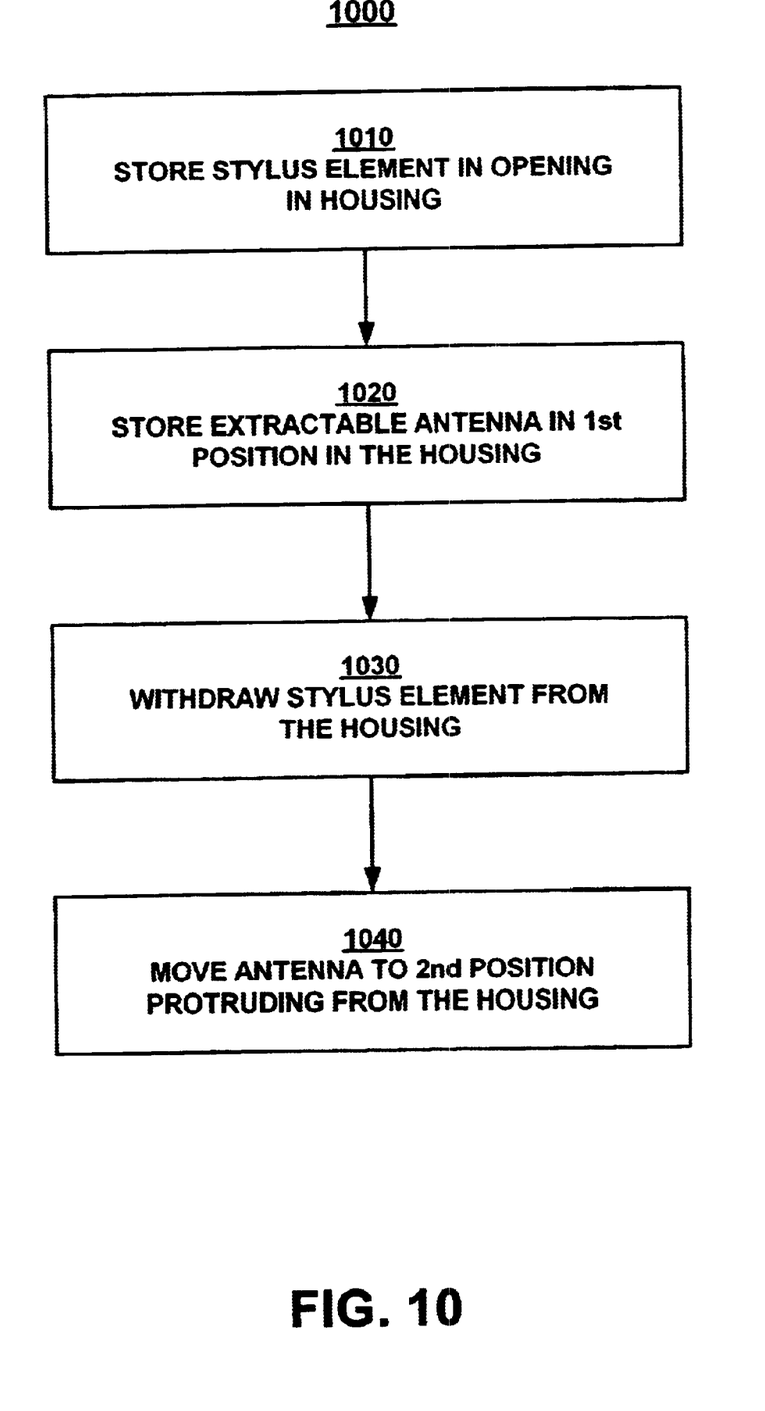
FIG. 10 is a flowchart of the steps in a process for storing and deploying an antenna in accordance with one embodiment of the present invention.

FIG. 10 is a flowchart of the steps in a process 1000 for storing and deploying an antenna (e.g., antenna 885 of FIGS. 8A and 8B) used by a wireless device in accordance with one embodiment of the present invention.

In step 1010 of FIG. 10, with reference also to FIG. 8A, in the present embodiment, the stylus element 880 is inserted into molded opening 810 in the housing 802 of a wireless communication device 800. In step 1020, inserting stylus element 880 causes antenna 885 to retract into the stored position (position 1) within the molded opening 810. Thus, in accordance with the present invention, antenna 885 and stylus element 880 are both positioned within molded opening 810. In one embodiment, stylus element 880 holds antenna 885 in position 1, and in another embodiment, antenna 885 is engaged with molded opening 810 in order to hold the antenna in position 1.

In step 1030 of FIG. 10, with reference also to FIG. 8B, in the present embodiment, stylus element 880 is removed from molded opening 810. In one embodiment, stylus element 880 is pressed further into molded opening 810, in order to disengage antenna 885 from molded opening 810.

In step 1040, with stylus element 880 removed, antenna 885 is free to move into the extracted (or protruded) position (position 2) by sliding within molded opening 810. In one embodiment, when stylus element 880 is removed, antenna 885 automatically moves to position 2 because of a force applied by spring 830. In another embodiment, antenna 885 moves to position 2 only after being disengaged from molded opening 810 as described in step 1030.

The preferred embodiment of the present invention, antenna extraction on removal of stylus for handheld device, is thus described. While the present invention has been described in particular embodiments, it should be appreciated that the present invention should not be construed as limited by such embodiments, but rather construed according to the below claims.

What is claimed is:

1. A device for sending and receiving signals to and from another device via a wireless connection, said device comprising:

a housing having an opening adapted to hold a removable stylus element, wherein said removable stylus element used as a mechanism for user's input;

a transceiver disposed within said housing, said transceiver adapted to send and receive wireless signals; and an extractable antenna having a base end and a distal end, said base end coupled to said housing;

wherein said extractable antenna is stored in a first position within said opening; and wherein withdrawal of said removable stylus element from said opening allows said extractable antenna to slide within said opening to a second position wherein said distal end is external to said housing.

2. The device of claim 1 wherein said extractable antenna is held in said first position using said removable stylus element, wherein said extractable antenna automatically moves to said second position when said removable stylus element is withdrawn.

3. The device of claim 1 wherein said extractable antenna in said first position is engaged with said opening, wherein movement of said removable stylus element causes said extractable antenna to disengage from said opening.

4. The device of claim 1 comprising:

a spring coupled to said base end of said extractable antenna and coupled to said housing.

5. The device of claim 1 wherein said extractable antenna is coupled to said transceiver via a flexible connector.

6. The device of claim 1 wherein said extractable antenna is coupled to said transceiver via a conducting element disposed within said opening, wherein said extractable antenna in said second position is in contact with said conducting element.

7. The device of claim 1 wherein said transceiver is a Bluetooth-enabled device.

8. In a device comprising a transceiver and an antenna, a method for storing and deploying said antenna, said method comprising the steps of:

a) storing a removable stylus element in an opening of a housing of said device wherein said removable stylus element used as a mechanism for user's input; and b) storing said antenna in a first position within said opening;

wherein withdrawal of said removable stylus element from said opening allows said antenna to slide within said opening to a second position wherein a distal end of said antenna is external to said housing.

9. The method as recited in claim 8 wherein said step b) comprises the step of:

holding said antenna is said first position using said removable stylus element, wherein said antenna automatically moves to said second position when said removable stylus element is withdrawn.

10. The method as recited in claim 8 wherein said step b) comprises the step of:

holding said antenna is said first position by engaging said antenna with said opening, wherein movement of said removable stylus element causes said antenna to disengage from said opening.

11. The method as recited in claim 8 wherein a base end of said antenna is coupled to a spring coupled to said housing.

12. The method as recited in claim 8 wherein said antenna is coupled to said transceiver via a flexible connector.

13. The method as recited in claim 8 wherein said antenna is coupled to said transceiver via a conducting element disposed within said opening, wherein said antenna in said second position is in contact with said conducting element.

14. The method as recited in claim 8 wherein said transceiver is a Bluetooth-enabled device.

15. A portable computer system comprising:
a housing having an opening adapted to hold a removable stylus element, wherein said removable stylus element used as a mechanism for user's input;
a transceiver disposed within said housing, said transceiver adapted to send and receive wireless signals;
an extractable antenna having a base end and a distal end, said base end coupled to said housing;
a processor disposed within said housing; and
a memory unit coupled to said processor;
wherein said extractable antenna is stored in a first position within said opening; and
wherein withdrawal of said removable stylus element from said opening allows said extractable antenna to slide within said opening to a second position wherein said distal end is external to said housing.

16. The portable computer system of claim 15 wherein said extractable antenna is held in said first position using said removable stylus element, wherein said extractable antenna automatically moves to said second position when said removable stylus element is withdrawn.

17. The portable computer system of claim 15 wherein said extractable antenna in said first position is engaged with said opening, wherein movement of said removable stylus element causes said extractable antenna to disengage from said opening.

18. The portable computer system of claim 15 comprising:
a spring coupled to said base end of said extractable antenna and coupled to said housing.

19. The portable computer system of claim 15 wherein said extractable antenna is coupled to said transceiver via a flexible connector.

20. The portable computer system of claim 15 wherein said extractable antenna is coupled to said transceiver via a conducting element disposed within said opening, wherein said extractable antenna in said second position is in contact with said conducting element.

* * * * *